(12) United States Patent
Takatani et al.

(10) Patent No.: US 6,534,746 B1
(45) Date of Patent: Mar. 18, 2003

(54) NARROW GAP WELDING METHOD AND WELDING APPARATUS

(75) Inventors: Toru Takatani, Ibaraki (JP); Yasuo Hayakawa, Ibaraki (JP); Yutaka Takano, Ibaraki (JP); Hikaru Yamamoto, Ibaraki (JP)

(73) Assignee: Hetachi Construction Machinery Co., Ltd., Tokyo (JP)

( * ) Notice: Subject to any disclaimer, the term of this patent is extended or adjusted under 35 U.S.C. 154(b) by 0 days.

(21) Appl. No.: 09/787,012

(22) PCT Filed: Mar. 28, 2000

(86) PCT No.: PCT/JP00/01920
§ 371 (c)(1),
(2), (4) Date: Mar. 12, 2001

(87) PCT Pub. No.: WO01/03875
PCT Pub. Date: Jan. 18, 2001

(30) Foreign Application Priority Data

Jul. 12, 1999 (JP) .............................. 11-197735
Dec. 9, 1999 (JP) .......................... 11-350485

(51) Int. Cl.$^7$ ................................................ B23K 9/09
(52) U.S. Cl. ............................. 219/137 PS; 219/130.51
(58) Field of Search ....................... 219/130.51, 130.31, 219/130.32, 130.33, 130.5, 137 PS (56) References Cited

U.S. PATENT DOCUMENTS

| | | | | | |
|---|---|---|---|---|---|
| 3,350,539 | A | * | 10/1967 | Manz et al. | 219/137 PS |
| 3,679,866 | A | * | 7/1972 | Arikawa et al. | 219/137 PS |
| 4,806,735 | A | * | 2/1989 | Ditschun et al. | 219/130.31 |
| 5,278,390 | A | * | 1/1994 | Blankenship | 219/130.5 |
| 5,834,732 | A | * | 11/1998 | Innami et al. | 219/130.51 |
| 2001/0047988 | A1 | * | 12/2001 | Hiraoka et al. | 219/137 PS |

FOREIGN PATENT DOCUMENTS

| | | |
|---|---|---|
| JP | 57-137073 | 8/1982 |
| JP | 60-174276 | 9/1985 |

* cited by examiner

Primary Examiner—Clifford C. Shaw
(74) Attorney, Agent, or Firm—Sughrue Mion, PLLC (57) ABSTRACT

A narrow gap welding method by which V-shaped or single-bevel grooved multi-layer build-up welding is carried out, comprises the steps of welding a first layer by applying a welding current by which a globule transfer pattern is made into a spray pattern by a waveform in which a direct current and a pulse current are caused to overlap, and thereafter welding the second layer by applying a direct current.

18 Claims, 6 Drawing Sheets

AMOUNT OF SLIPPAGE OF TARGET POSITION (Y)

FIG. 5

| AMOUNT OF SLIPPAGE \ PULSE FREQUENCY | 35Hz | 50Hz | 65Hz | 100Hz | 400Hz |
|---|---|---|---|---|---|
| Y = 0 (mm) | △ | ○ | ○ | ○ | ○ |
| Y = 1 (mm) | × | ○ | ○ | ○ | ○ |
| Y = 2 (mm) | × | △ | ○ | ○ | ○ |
| Y = 3 (mm) | × | △ | △ | ○ | ○ |

NARROW GAP WELDING METHOD AND WELDING APPARATUS

TECHNICAL FIELD OF THE INVENTION

The present invention relates to a narrow gap welding method by which V-shaped or single-bevel grooved multi-layer build-up welding is carried out in MAG or MIG welding, and an apparatus for welding the same.

BACKGROUND OF THE INVENTION

As civil construction machines such as a hydraulic shovels, etc., have been made larger and larger, steel plates that constitute structures such as arms, booms, buckets, etc., of the civil construction machines have become thicker and thicker, wherein a great deal of time has been required for welding work.

As one of the methods for shortening the welding time, there is a method for decreasing the total amount of weld by making V-shaped or single-beveled welding grooves into narrow gaps. However, in the case of making them into narrow gaps, an important factor becomes the prevention of welding defects from occurring particularly in the first layer.

For example, as shown in Japanese Laid-open Patent Publication No. 108275 of 1996, if members to be welded are tubular, the end faces thereof are very accurately machined to form welding grooves, and automatic welding may be performed. But, as in the structure of a civil construction machine, if welding grooves are formed, by machining, in large-sized members having complicated outer profiles consisting of straight lines and curved lines, the working costs thereof will become very expensive, wherein the costs of welding cannot be absorbed, resulting in an increase in the total production costs.

Figure 7:
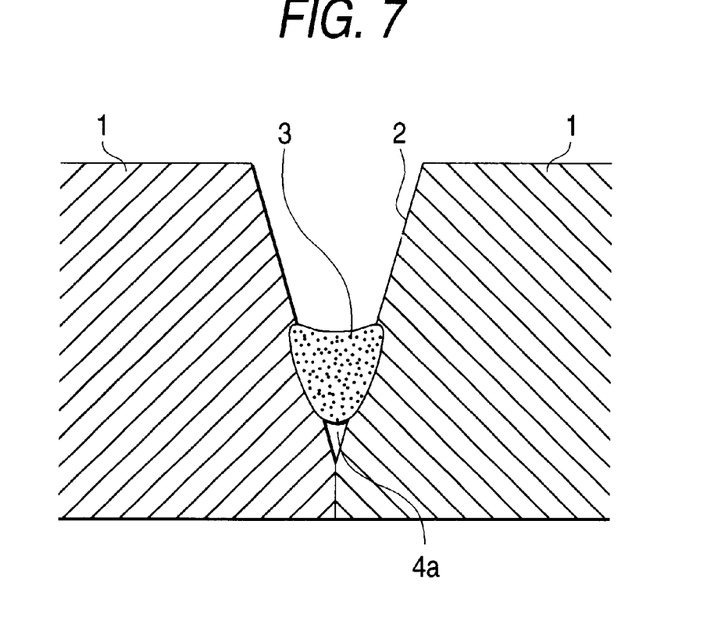
FIG. 7, FIG. 8, FIG. 9 and FIG. 10 are sectional views showing the results of welding of the first layer in respective narrow grooved welding.

In the welding of welding grooves, for example, where the welding current is small in the first layer, the amount of heat input into members to be welded is low. Therefore, as shown in FIG. 7, a space 4a that cannot be buried by the first layer welding bead 3 occurs on the bottom of a welding groove 2 formed on a pair of welding matrices 1 as a welding defect.

Figure 8:
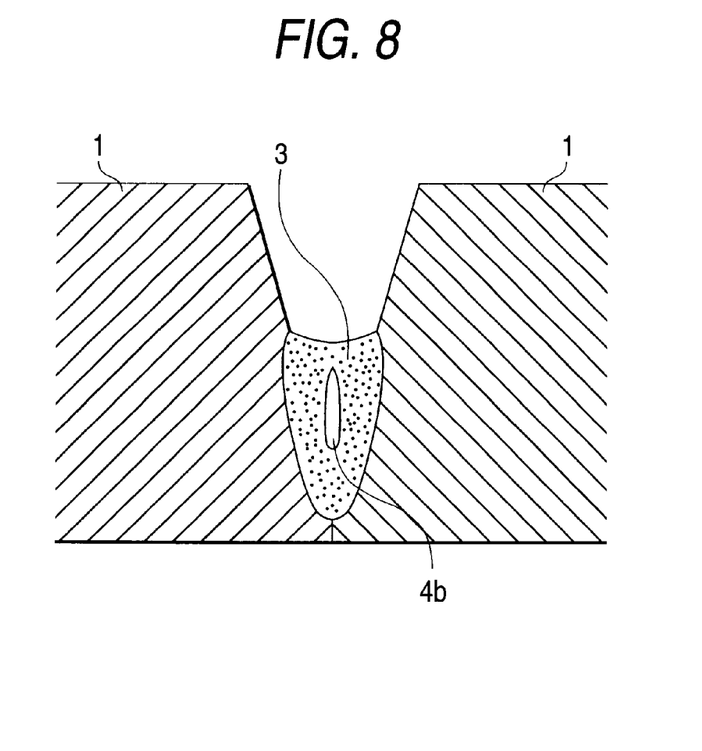

If the welding current is increased, as shown in FIG. 8, while a sufficient amount of heat input can be obtained with respect to the welding matrices 1, the amount of a filler metal that melts is increased. Therefore, the longitudinal and latitudinal ratio (ratio of height to width of a welding bead) of a welding bead 3 is accordingly increased, wherein a welding defect such as a hot crack 4b occurs in the welding bead 3.

In order to sufficiently secure penetration with respect to a welding matrix and prevent a hot crack from occurring in welding beads, it is necessary that the welding current is increased, and at the same time the height of welding beads formed at the welding portions is suppressed to be low by making the welding rate faster.

Figure 9:
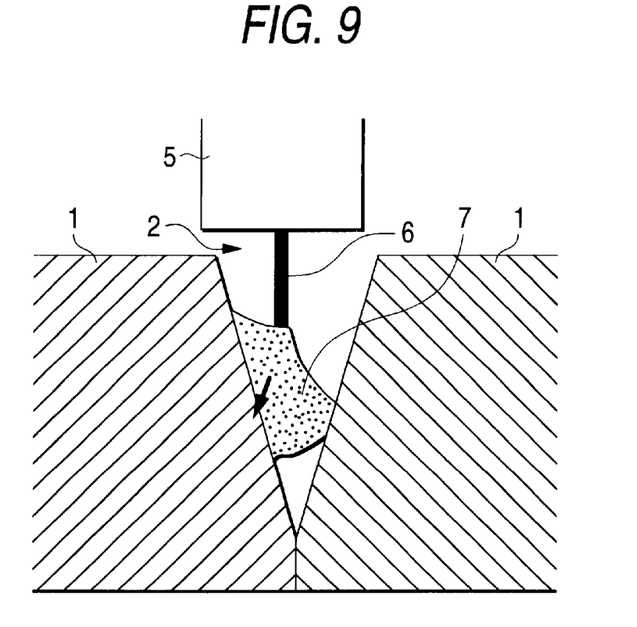
Figure 10:
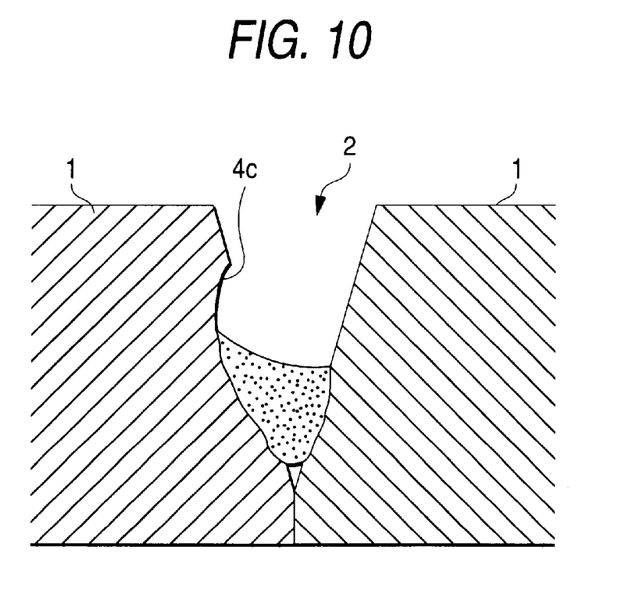

Also, as shown in FIG. 9, as a welding wire 6 approaches one side wall shifting from the center position of the groove 2, an arc 7 flows to the side wall where the welding wire approaches, wherein after the welding is finished, a larger undercut 4c occurs as shown in FIG. 10. Also, since the center of the arc is not oriented toward the bottom portion of the groove 2 (the directivity is low), there may be a case where penetration at the bottom portion of the groove 2 becomes insufficient.

The directivity of an arc in welding can be obtained by a pinch force operating on the arc. As one of the pinch forces operating on the arc, there is an electromagnetic pinch force that is generated by a welding current. The intensity of the electromagnetic pinch force is proportionate to a square of the welding current.

Therefore, in the first layer welding in the structure of a civil construction machine, etc., it is difficult to employ a welding method such as semi-automatic welding in which a serpentine run of a welding wire or a deviate of the target position due to hand shake is unavoidable. The welding has manually been carried out by a skilled welding worker, wherein it is difficult to decrease welding costs.

In view of the abovementioned situations, it is therefore an object of the invention to provide a narrow gap welding method and a welding apparatus therefor, that enables the application of automatic or semi-automatic welding in a first layer in narrow groove welding, by improving the directivity of an arc generated in welding, and increasing allowance with respect to a serpentine run of a welding wire or a deviate of the target position due to hand shake.

DISCLOSURE OF THE INVENTION

In order to achieve the object, a first aspect of the invention is a method for welding narrow V-shaped or single-beveled grooves by MAG or MIG welding, comprising the steps of welding in a first layer by applying a welding current by which a globule transfer pattern is made into a spray pattern by a waveform in which a direct current and a pulse current are caused to overlap between a welding matrix and a filler metal, and thereafter welding the second layer by applying a direct current.

A second aspect of the invention is featured in that the abovementioned direct current is made into 200 A through 300 A while the peak value of the pulse current overlapped on the direct current is made into 400 A through 500 A.

A third aspect of the invention is featured in that the frequency of the abovementioned pulse current is made into 50 Hz or more.

A fourth aspect of the invention is an apparatus for welding a V-shaped or a single-beveled groove by MAG or MIG welding, which comprises a welding power source that applies welding power to a welding portion composed of a welding matrix and a filler metal, a current controller that compares a predetermined welding current with a welding current supplied to the welding portion and transmits a current controlling signal, a voltage controller that compares a predetermined welding voltage with a welding voltage supplied to the welding portion and transmits a voltage controlling signal, a pulse waveform controller that transmits a pulse waveform signal based on a predetermined peak voltage, base voltage and frequency, and an output controller that controls an output of the abovementioned welding power source based on outputs of the abovementioned current controller, voltage controller and pulse waveform controller, and applies required welding power to the abovementioned welding portion.

A fifth aspect of the invention is an apparatus for welding a V-shaped or a single-beveled groove in a multi-layered build-up by MAG or MIG welding, which comprises a mechanism for moving a welding torch, a controller that controls the abovementioned mechanism so that the abovementioned welding torch is moved relative to a welding matrix along a welding line of the welding matrix, a welding power source, in which a plurality of welding current waveforms are set, that applies welding power between the abovementioned welding torch and welding matrix, a pulse waveform controller that generates welding current waveforms applied between a welding matrix and a filler metal in the first layer of the welding matrix, and an output controller that generates a direct current waveform when welding the second and subsequent layers of the welding matrix, and simultaneously controls an output waveform of the abovementioned welding power source, placing priority on the welding current waveform when a welding current waveform is inputted from the abovementioned pulse waveform controller.

BEST MODE FOR CARRYING OUT THE INVENTION

Hereinafter, a description is given of embodiments of the invention on the basis of the accompanying drawings.

Figure 1:
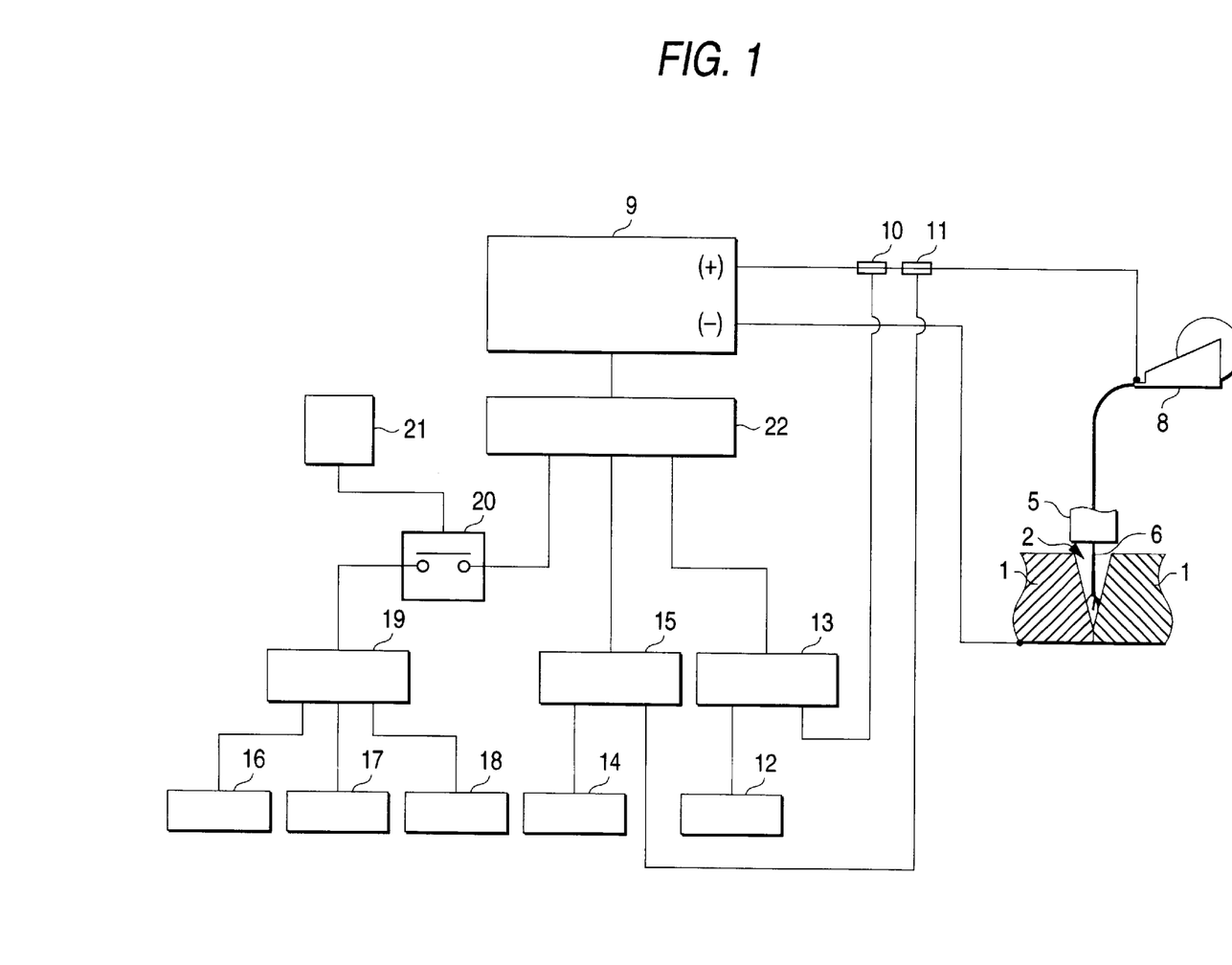
FIG. 1 is a configurational view of a welding apparatus according to the invention.
Figure 2:
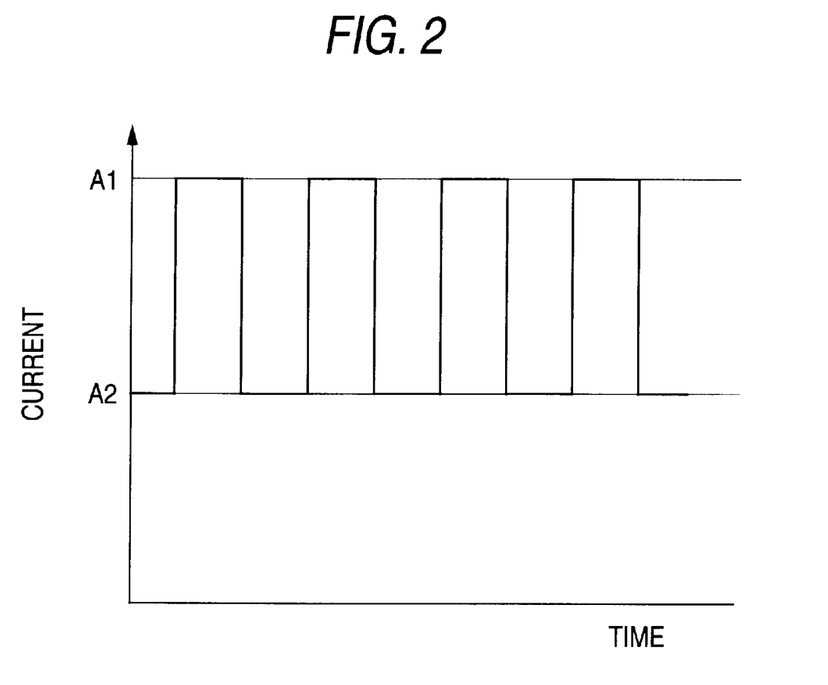
FIG. 2 is a characteristic view showing welding current waveforms of the first layer in narrow grooved welding according to the invention.
Figure 3:
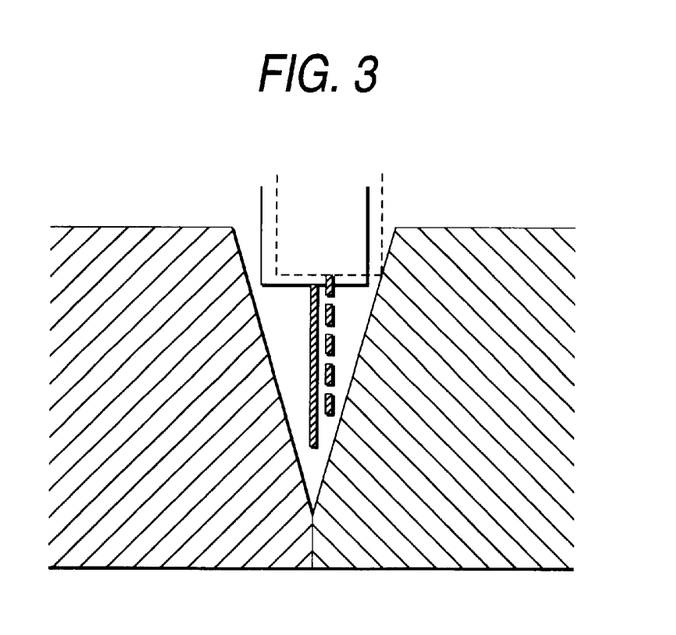
FIG. 3 is a sectional view showing a state of welding made by the invention.
Figure 4:
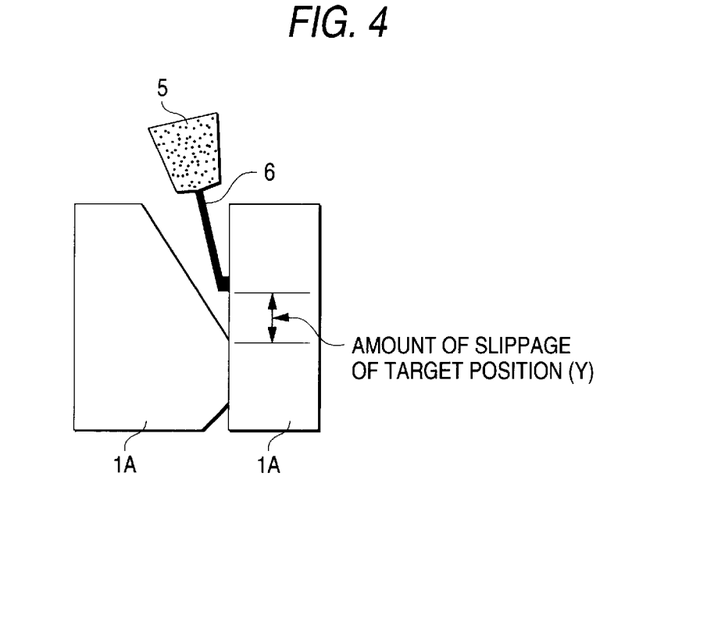
FIG. 4 is a sectional view showing a state of an experiment to confirm the frequency of pulses according to the invention.
Figure 5:
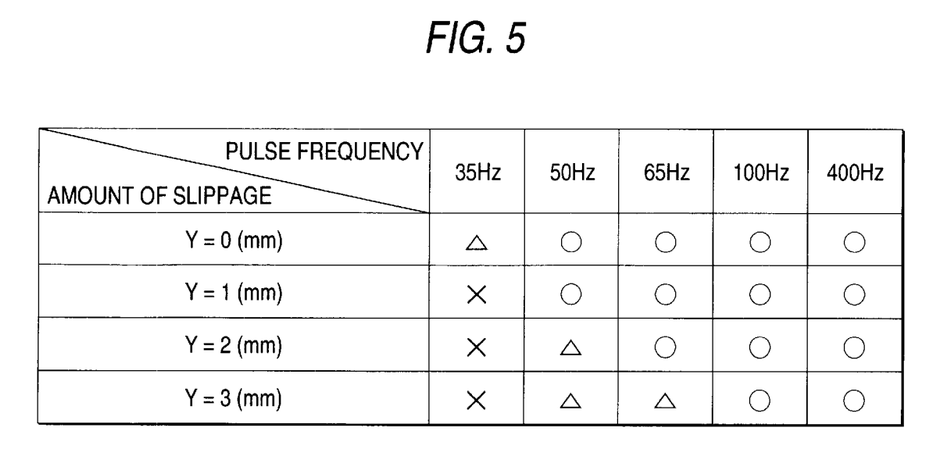
FIG. 5 is a characteristic view showing the results of the experiment.

FIG. 1 through FIG. 5 show the first embodiment of the invention, wherein FIG. 1 is a configurational view of a welding apparatus according to the invention, FIG. 2 is a characteristic view showing a welding current waveform in the first layer according to the invention, FIG. 3 is a sectional view showing the relationship in position between a welding matrix and a welding wire when welding, FIG. 4 is a side elevational view showing a state of welding in a confirmation experiment according to the invention, and FIG. 5 is a characteristic view showing the results of the confirmation experiment.

In FIG. 1, a welding matrix 1 has a V-shaped groove 2 formed therein. 5 denotes a welding torch, and a welding wire 6 is sent out from a feeder device 8 and is supplied from the tip end of the welding torch 5 into the groove 2.

The welding matrix 1 and welding wire 6 are connected to the output terminals of a welding power source 9. A current detector 10 detects a welding current supplied from the welding power source 9 to the welding wire 6. A voltage detector 11 detects a voltage of the welding current supplied from the welding power source 9 to the welding wire 6.

A current setter 12 sets a current value to be supplied to the welding wire 6. A current controller 13 compares the current value set by the current setter 12 with a current value detected by the current detector 10 and transmits a current controlling signal.

A voltage setter 14 sets a voltage value of the current supplied to the welding wire 6. A voltage controller 15 compares the voltage value set by the voltage setter 14 with a voltage value detected by the voltage detector 11 and transmits a voltage controlling signal.

16 denotes a peak voltage setter, and 17 denotes a base voltage setter. A time setter 18 sets a pulse time and a base time. A pulse waveform controller 19 is connected to the peak voltage setter 16, base voltage setter 17 and pulse time setter 18, and generates required pulse waveforms on the basis of the peak voltage and base voltage applied therefrom, and the pulse time and base time.

A switch 20 is caused to intervene at the output side of the pulse waveform controller 19. A changer 21 opens and closes the switch 20.

An output controller 22 is connected to the pulse waveform controller 19 via the current controller 13, voltage controller 15 and switch 20, and controls the welding power source 9 based on signals applied therefrom.

With such a construction, when carrying out the first layer, a welding wire 6 is pushed into a narrow groove 2 formed between a pair of welding matrices 1 with the center of the groove 2 made into the target position, and the changer 21 opens the switch 20, wherein welding is commenced in a state where a pulse waveform generated by the pulse waveform controller 19 is applied to the output controller 22.

At this time, the welding power source 9 sets the peak current value to a value higher by 100 through 300 A than the average current value at the current value, where the globule transfer pattern in which the average current value is 300 A or more is made into spray transfer, between the welding matrix 1 and welding wire 6 on the basis of an instruction from the pulse waveform controller 19, and, as shown in FIG. 2, applies a current having a characteristic such that a pulse-like peak current the current value of which is A1 is caused to overlap the base current whose current value is A2. Further, the frequency of the peak current is set to 50 Hz or more.

If the frequency of the peak current is set to 50 Hz or more, an electromagnetic pinch force that is proportionate to a square of the peak current value can be obtained as an electromagnetic pinch force acting on an arc. Therefore, if the average currents are the same, by using a pulse current for which the peak current frequency is 50 Hz or more, the electromagnetic pinch force acting on the arc is increased, and the directivity of the arc can be improved.

As shown in FIG. 3, since the directivity of the arc is intensive even if the target position of the welding wire 6 shifts from the center position of the groove 2 to one side of the side thereof, the center of the arc can be oriented to the vicinity (root portion) of the groove 2. That is, even if the tip end position of the welding wire 6 sways due to meandering of the welding wire 6, the center of the arc can be oriented to the advancing direction (the bottom of the groove 2) of the welding wire 6 by an intensive electromagnetic pinch force. Therefore, sufficient penetration at the bottom portion can be obtained.

Accordingly, in comparison with a case of welding using merely a direct current, higher speed welding is enabled, whereby it is possible to suppress the height of the welding bead to a low level, and it is possible to prevent the welding bead from being cracked due to a high temperature.

As shown in FIG. 4, a single beveled groove whose opening angle is 30° is formed in a test piece 1A, and welding is carried out by the abovementioned welding method while changing the target position of a welding wire 6 sent out from the welding torch 5. The visually checked results thereof are shown in FIG. 5.

In FIG. 5, the symbol ○ shows a state where the welding is satisfactory and there is no defect in the welding, the symbol Δ shows a state where a slight defect that does not adversely affect the quality, and the symbol X shows a state where a serious defect that aversely affects the quality exists.

As shown in FIG. 5, in the case where the pulse frequency is 50 Hz, if an amount of deviation of the target position is 1 mm, welding free from any defect is enabled. Also, if the amount of deviation of the target position exceeds 2 mm, a light defect such as insufficient penetration and light undercut, which does not usually affect the quality, occurs.

Further, where the pulse frequency becomes 100 Hz or more, even if the amount of deviation of the target position is 3 mm, welding free from any defect can be carried out. However, where the amount of deviation of the target position is 35 Hz, even if the amount of deviation of the target position is 0 mm, a light defect occurred.

Therefore, if the pulse frequency is 50 Hz or more, welding that does not adversely affect the welding quality can be carried out. Also, preferably, by setting the pulse frequency to 100 Hz or more, welding free from any defects can be carried out even if semi-automatic welding in which the target position may change is applied to the welding of a narrow groove.

Since the changer 20 is opened in a case where the second and subsequent layered welding is carried out, no pulse waveform that is generated by the pulse waveform controller 19 is inputted into the output controller 22. Therefore, the output controller 22 controls the welding power source 9 so that a direct current, which is set by a current value set by the current setter 12 and applied through the current controller 13 and the voltage value set by the voltage steer 14 and applied through the voltage controller 15, is applied between the welding wire 6 and the welding matrix 1.

And, by carrying out welding by a direct current that causes an arc to easily shift to the side wall of a groove, penetration into the side wall of the groove can be fostered.

In addition, as regards the welding conditions for the second and subsequent layered welding, it is possible to establish the welding current, welding voltage, welding rate, etc., on the basis of the welding amount, bead width, and welding leg, etc., which are required in respective layers.

Figure 6:
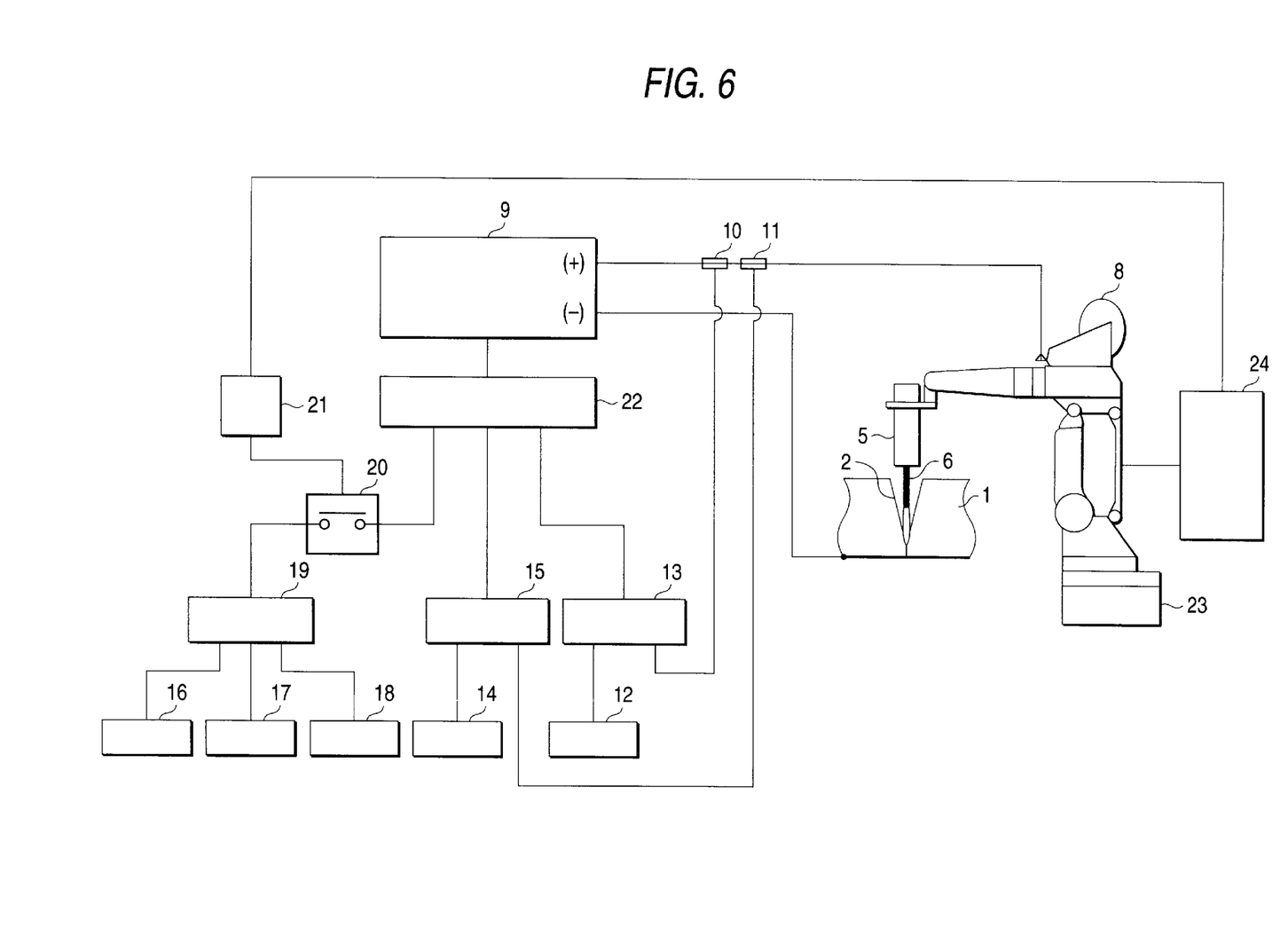
FIG. 6 is a configurational view of a welding apparatus according to the invention.

FIG. 6 is a view showing a second embodiment of the invention.

In FIG. 6, 1 denotes a welding matrix in which a V-shaped groove 2 is formed. 23 denotes a multi-joint type welding robot that constitutes a mechanism portion. A welding torch 5 is supported at the free end of the welding robot 23. A welding wire 6 is sent out from a feeder 8 incorporated in the welding robot 23 and is supplied to the welding portion through the welding torch 5.

A controller 24 controls actions of the welding robot 23 and causes the welding torch 5 to move along the channels taught in advance and transmits the necessary signals.

A changer 21 controls opening and closing of a switch 20 on the basis of instructions from the controller 24. All the other constructions are identical to those of the first embodiment, and overlapping description thereof is omitted.

With such constructions, the controller 24 controls the welding robot 23 so that the welding torch 5 moves along the welding channels taught in advance. Simultaneously, it applies required welding power between the welding matrix 1 and the welding wire 6 to perform welding of the welding matrix 1.

At this time, the controller 24 closes the switch 20 via the changer 21 if the welding is the first layer weld of the welding matrix 1, and opens the switch 20 via the changer 21 if the welding is the second and subsequent layered weld.

In the case of the first layer of the welding matrix 1, a pulse waveform generated by the pulse waveform controller 19 in compliance with the conditions established by the peak voltage setter 16, base voltage setter 17 and pulse time setter 18 is applied to the output controller 22 through the changer 20, and the output controller 22 controls the welding power source 9 based on the pulse waveform applied from the pulse waveform controller 19, and applies the required welding power between the welding wire 6 and the welding matrix 1.

In the second embodiment, the base current value, peak current value and current frequency are established as in the first embodiment. The result is the same as that in the first embodiment.

INDUSTRIAL APPLICABILITY

As described above, the invention relates to a narrow groove welding method that carries out V-shaped welding and single-beveled multi-layered welding, wherein in the first layer weld, welding is carried out by applying a welding current, which resides in an area where the globule transfer is made into a spray transfer, to a welding portion with a waveform obtained by causing a direct current and a pulse current to overlap each other, and in the second and subsequent layered welding, welding is carried out by applying a DC welding current to a welding portion. Therefore, the directivity of an arc can be improved in the first layer weld, and allowances can be widely improved with respect to a deviate of the target position, and automatic welding and semi-automatic welding in which the target position may be liable to deviate due to meandering or hand shake of a welding wire can be applied to welding of narrow grooves that are processed by gas cutting that is inferior in the accuracy to machining. Further, since the welding amount can be decreased by making the width of grooves narrow, the welding time and costs can be remarkably reduced, and the working costs of welding structures can be reduced to a large extent.

What is claimed is:

1. A method for welding V-shaped or single-beveled grooves by MAG and MIG welding, the method comprising the steps of:

applying a welding current to weld a first layer, wherein a globule transfer is made into a spray transfer by a waveform in which a direct constant current and a pulse current are caused to overlap between a welding matrix and a filler metal; and applying a direct current to weld second and subsequent layers.

2. The method as set forth in claim 1, wherein said direct current is 200 A through 300 A while the peak value of the pulse current overlapped on the direct constant current is 400 A through 500 A.

3. The method as set forth in claim 1 or 2, wherein the frequency of the pulse current is 50 Hz or more.

4. The method as set forth in claim 1 or 2, wherein the frequency of the pulse current is 100 Hz or more.

5. The method as set forth in claim 4, wherein defect free welding can be carried out even if welding, in which a target position changes, is applied to welding of a narrow groove.

6. An apparatus for welding a V-shaped or a single-beveled groove by MAG or MIG welding, the apparatus comprising:

a welding power source that applies welding power to a welding portion including a welding matrix and a filler metal;

a current controller that compares a predetermined welding current with a welding current supplied to the welding portion and transmits a current controlling signal;

a voltage controller that compares a predetermined welding voltage with a welding voltage supplied to the welding portion and transmits a voltage controlling signal;

a pulse waveform controller that transmits a pulse waveform signal based on a predetermined peak voltage, base voltage and frequency; and an output controller that controls an output of the welding power source based on outputs of the current controller, voltage controller and pulse waveform controller, and applies required welding power to the welding portion.

7. An apparatus for welding a V-shaped or a single-beveled groove by MAG or MIG welding, according to claim 6 the apparatus further comprising:

a welding wire that is supplied from a tip end of a welding torch into a groove of the welding matrix;

a current detector that detects the welding current supplied to the welding portion;

a voltage detector that detects the welding voltage supplied to the welding portion;

a current setter that sets the predetermined welding current;

a voltage setter that sets the predetermined welding voltage;

a time setter that sets a pulse time and a base time;

a switch that intervenes at the output side of the pulse waveform controller; and a changer that opens and closes the switch.

8. An apparatus for welding a V-shaped or a single-beveled groove by MAG or MIG welding, according to claim 7, wherein the pulse waveform controller is connected to a peak voltage setter, a base voltage setter and the time setter.

9. An apparatus for welding a V-shaped or a single-beveled groove by MAG or MIG welding, according to claim 7, wherein the output controller is connected to the pulse waveform controller via the current controller, the voltage controller and the switch.

10. An apparatus for welding a V-shaped or a single-beveled groove by MAG or MIG welding, according to claim 7, wherein the welding current supplied to the welding portion is the welding current supplied from the welding power source to the welding wire.

11. An apparatus for welding a V-shaped or a single-beveled groove by MAG or MIG welding, according to claim 7, wherein the welding voltage supplied to the welding portion is the welding voltage supplied from the welding power source to the welding wire.

12. An apparatus for welding a V-shaped or a single-beveled groove by MAG or MIG welding, according to claim 7, wherein the predetermined welding voltage is the voltage value of a current to be supplied to the welding wire.

13. An apparatus for welding a V-shaped or a single-beveled groove by MAG or MIG welding, according to claim 7, wherein the predetermined welding current is the current value of a current to be supplied to the welding wire.

14. An apparatus for welding a V-shaped or a single-beveled groove by MAG or MIG welding, according to claim 7, wherein the welding matrix and the welding wire are connected to the output terminals of the welding power source.

15. An apparatus for welding a V-shaped or a single-beveled groove in a multi-layered build-up by MAG or MIG welding, the apparatus comprising:

a mechanism for moving a welding torch;

a controller that controls the mechanism so that the welding torch is moved relative to a welding matrix along a welding line of the welding matrix;

a welding power source, in which a plurality of welding current waveforms are set, that applies welding power between the welding torch and welding matrix;

a pulse waveform controller that generates welding current waveforms applied between a welding matrix and a filler metal in a first layer of the welding matrix;

an output controller that generates a direct current waveform and simultaneously controls an output waveform of the welding power source based on the welding current waveform which is inputted from the pulse waveform controller; and a current wave form changer for suspending input of the welding current waveforms into the output controller when welding the second and subsequent layers of the welding matrix so that the output controller controls the output waveform of the welding power based on the direct constant current waveform.

16. An apparatus for welding a V-shaped or a single-beveled groove by MAG or MIG welding, according to claim 15, further comprising a changer that controls opening and closing of a switch on the basis of instructions from the controller.

17. An apparatus for welding a V-shaped or a single-beveled groove by MAG or MIG welding, according to claim 16, wherein the controller closes the switch via the changer when welding the first layer of the welding matrix.

18. An apparatus for welding a V-shaped or a single-beveled groove by MAG or MIG welding, according to claim 16, wherein the controller opens the switch via the changer when welding the second and subsequent layers of the welding matrix.

* * * * *

UNITED STATES PATENT AND TRADEMARK OFFICE
CERTIFICATE OF CORRECTION

PATENT NO.     : 6,534,746 B1
DATED          : March 18, 2003
INVENTOR(S)    : Toru Takatani et al.

It is certified that error appears in the above-identified patent and that said Letters Patent is hereby corrected as shown below:

<u>Title page,</u>
Item [73], Assignee, should read as follows: -- Hitachi Construction Machinery Co., Ltd. (Tokyo (JP) --

Signed and Sealed this

Fifteenth Day of July, 2003

JAMES E. ROGAN
*Director of the United States Patent and Trademark Office*